Aug. 29, 1961  G. NEUENDORF ET AL  2,997,831
BAG MAKING APPARATUS
Filed Aug. 17, 1959  12 Sheets-Sheet 1

INVENTORS
Gunter Neuendorf
Karl Heinz Damelzig
Paul Schmidt
Wilhelm Reil

BY Michael S. Striker
Attorney

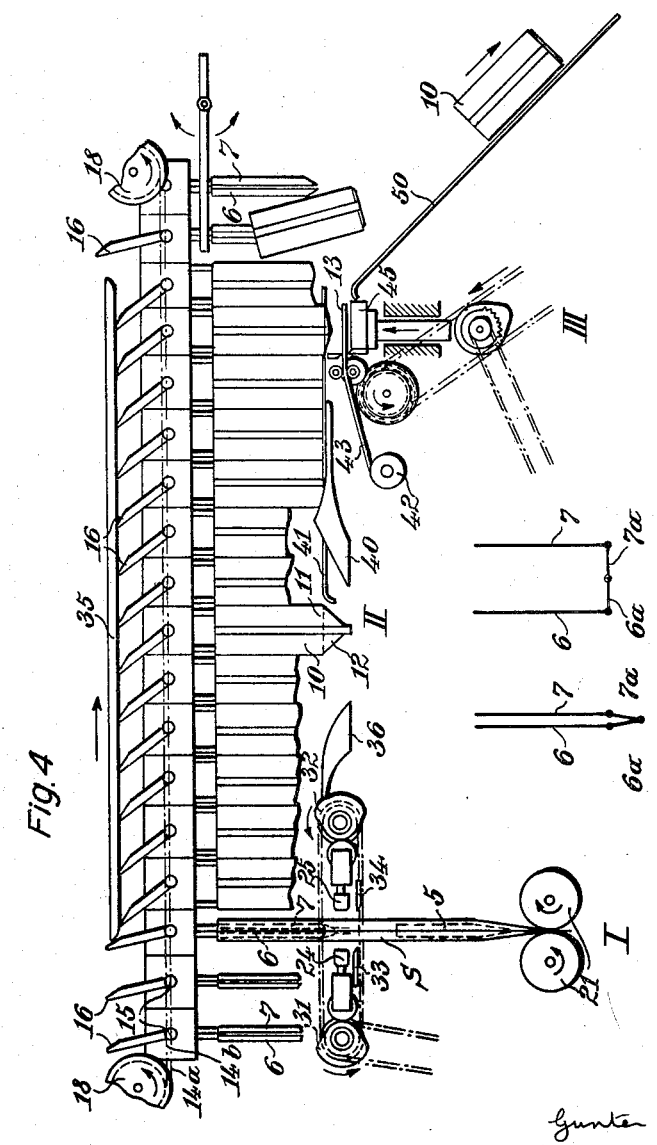

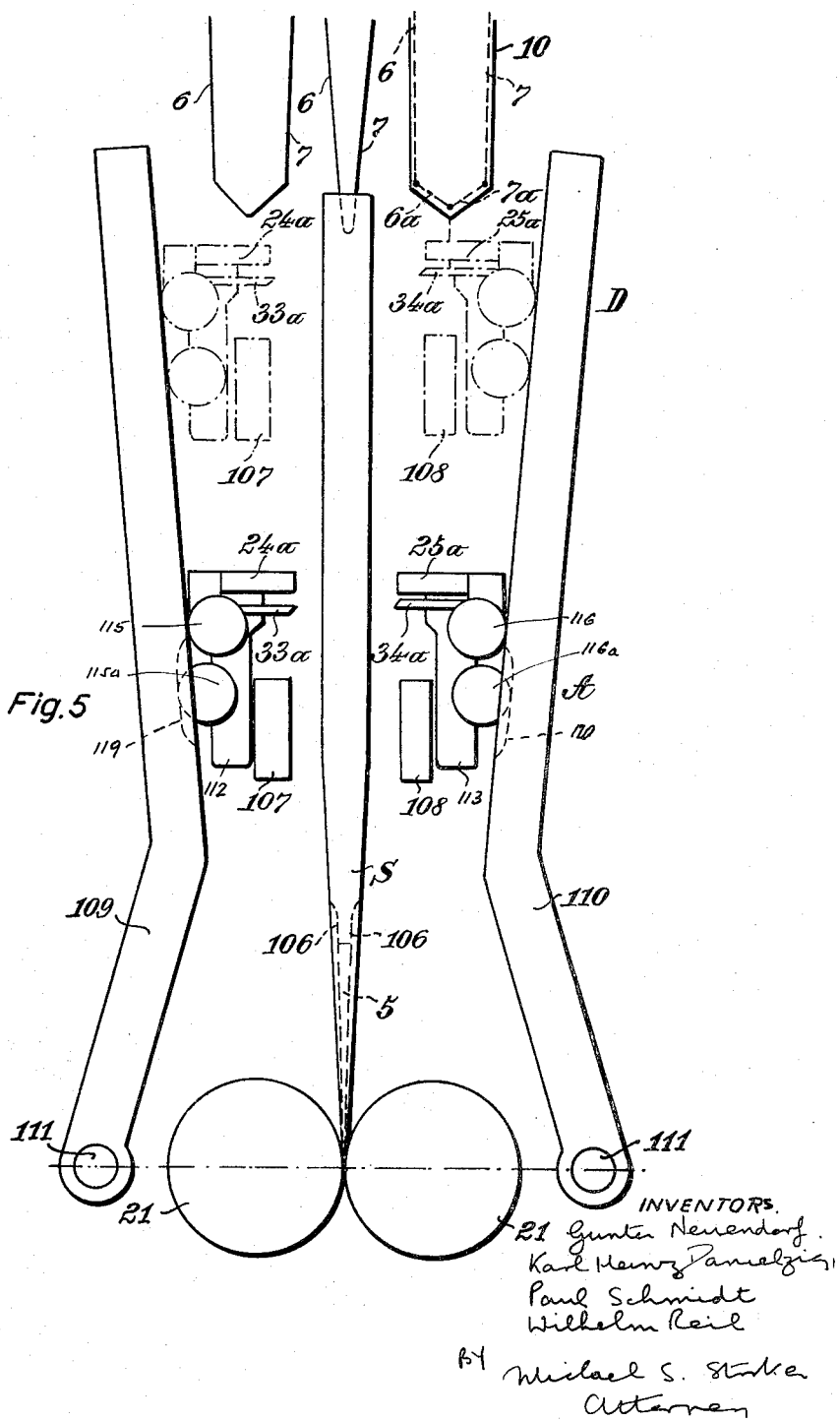

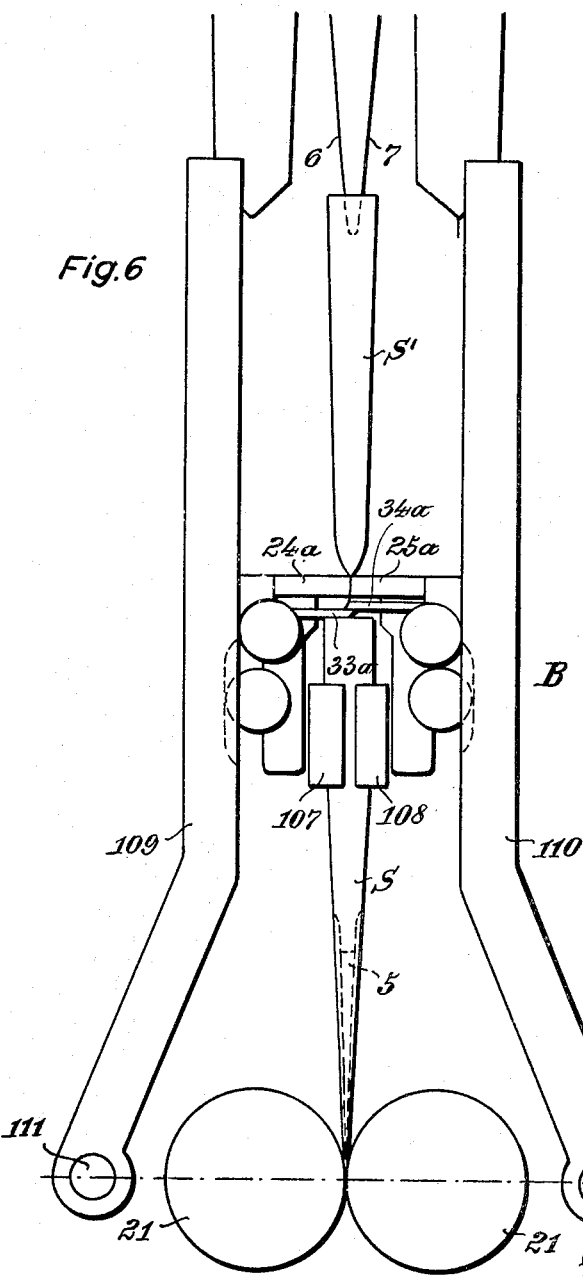

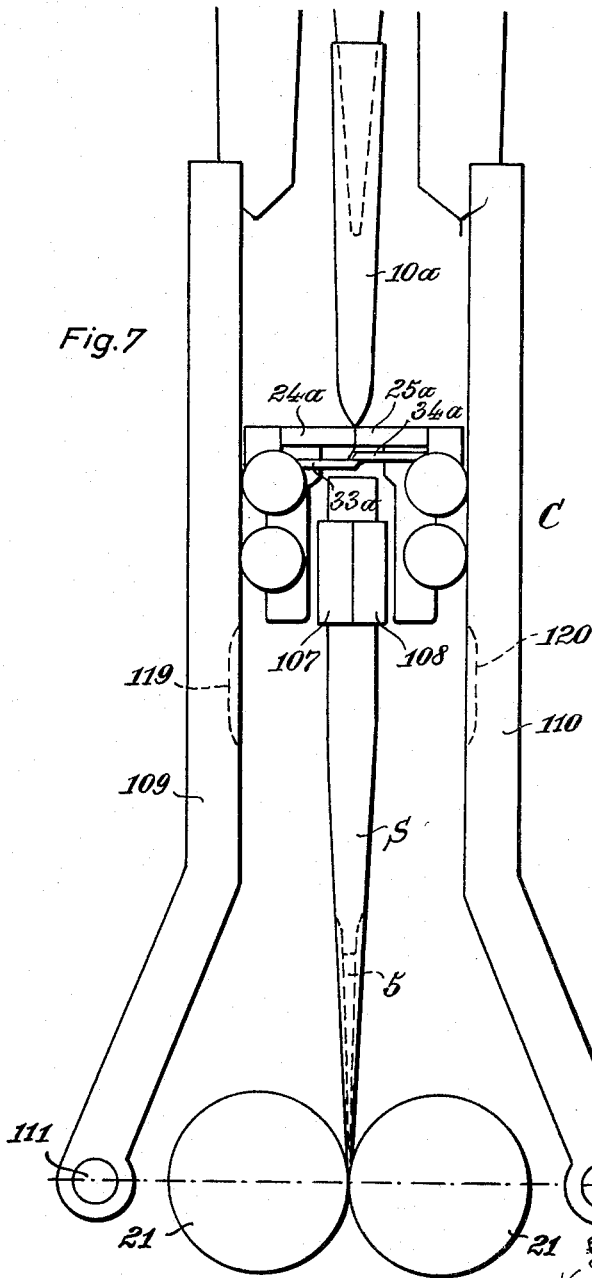

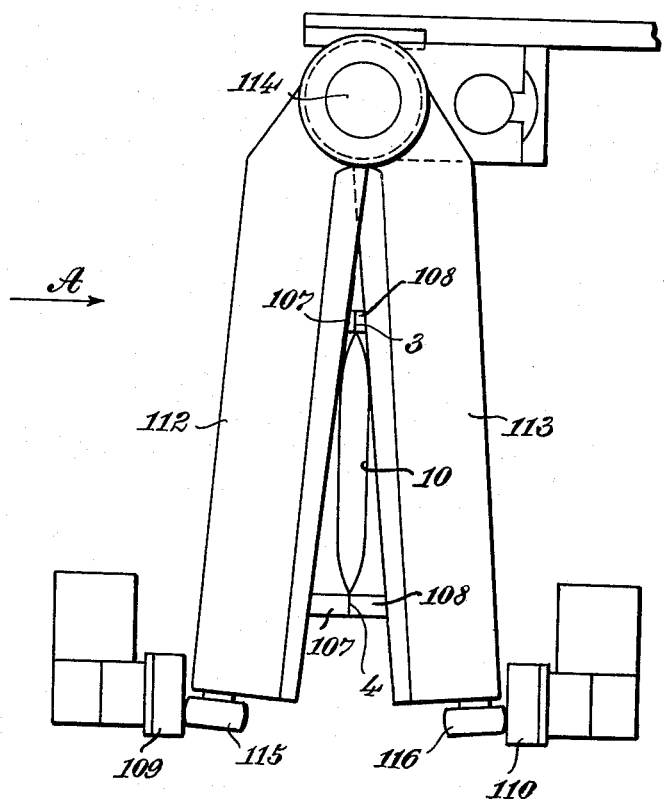

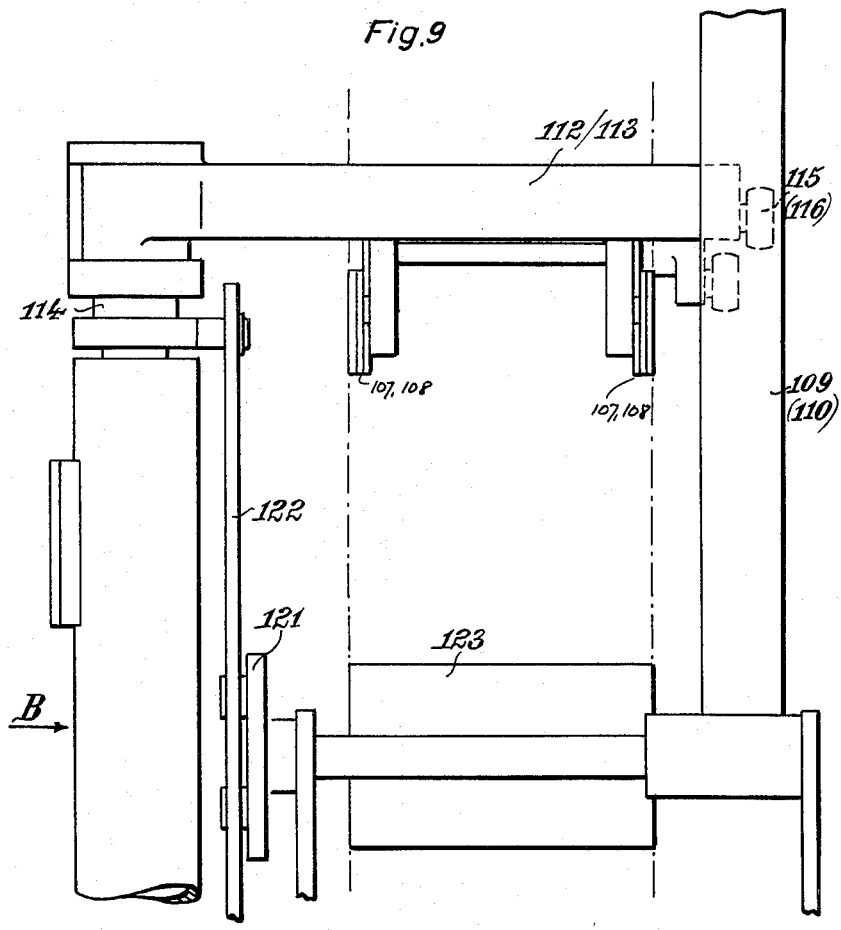

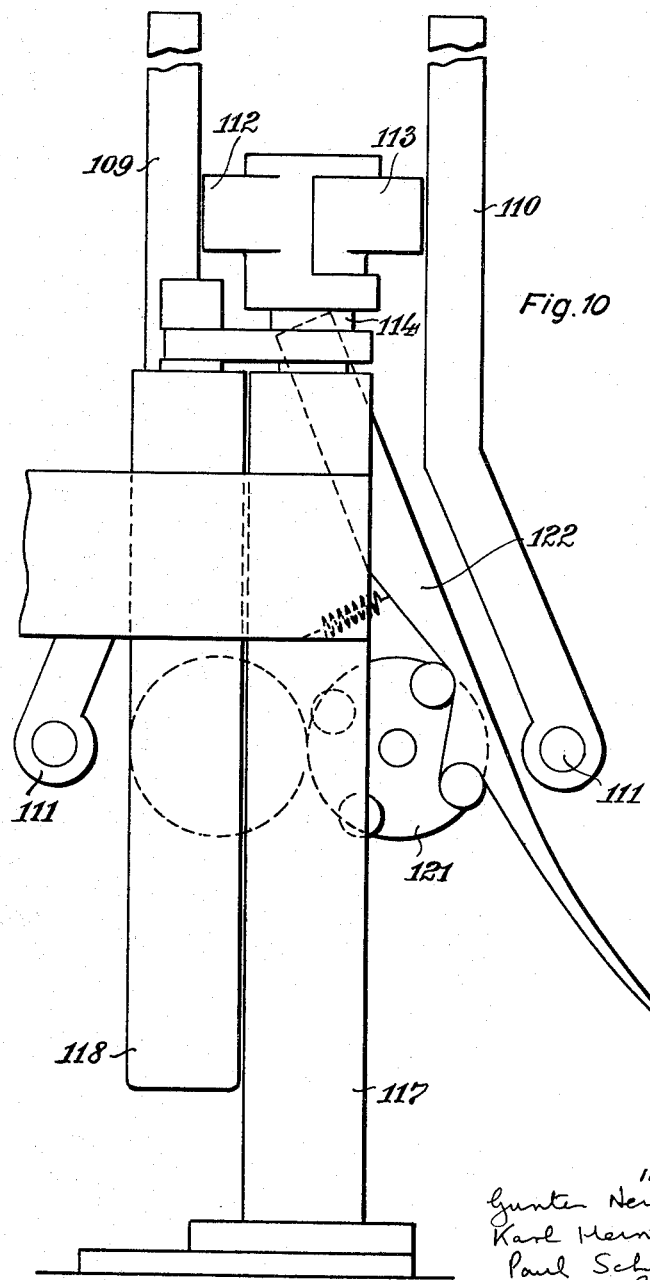

Aug. 29, 1961     G. NEUENDORF ET AL     2,997,831
BAG MAKING APPARATUS
Filed Aug. 17, 1959     12 Sheets-Sheet 9
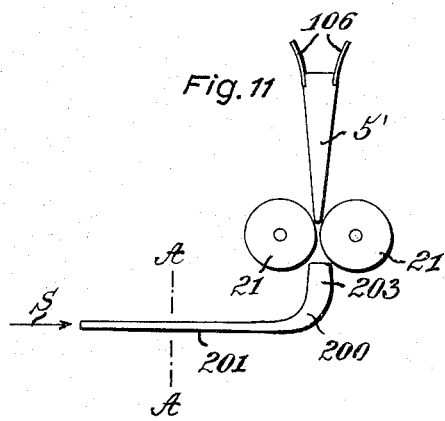
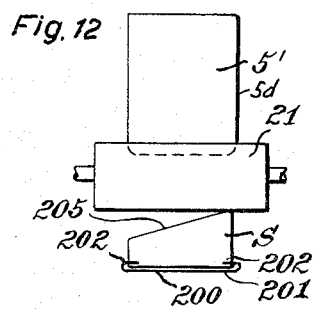
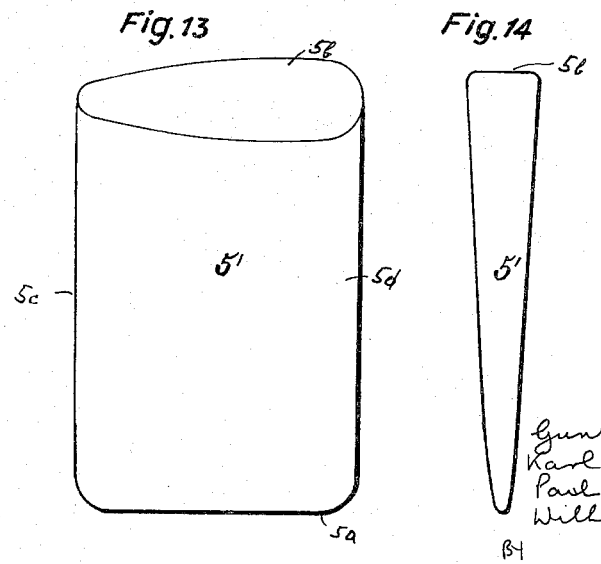
INVENTOR
Gunter Neuendorf
Karl Heinz Danielzig
Paul Schmidt
Wilhelm Reil
BY
Michael S. Striker
Attorney

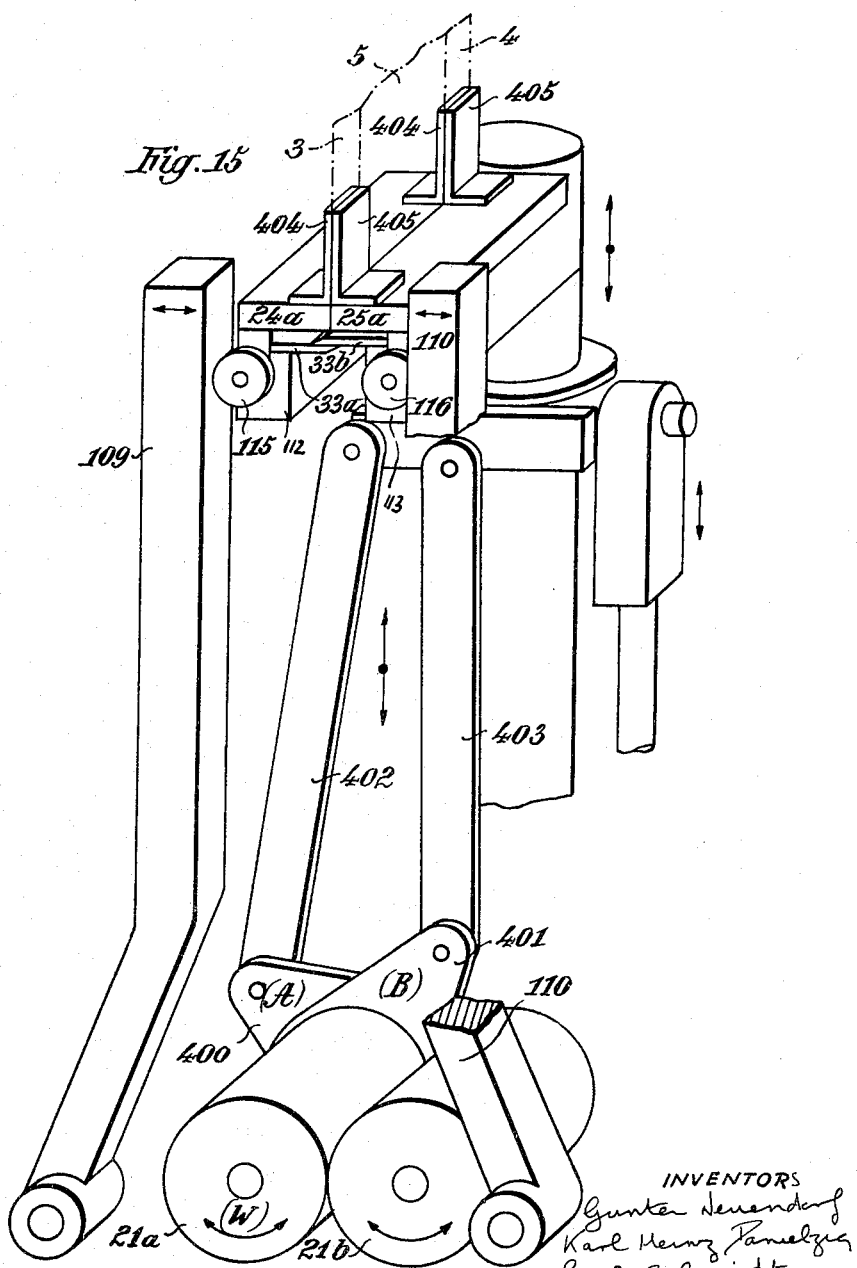

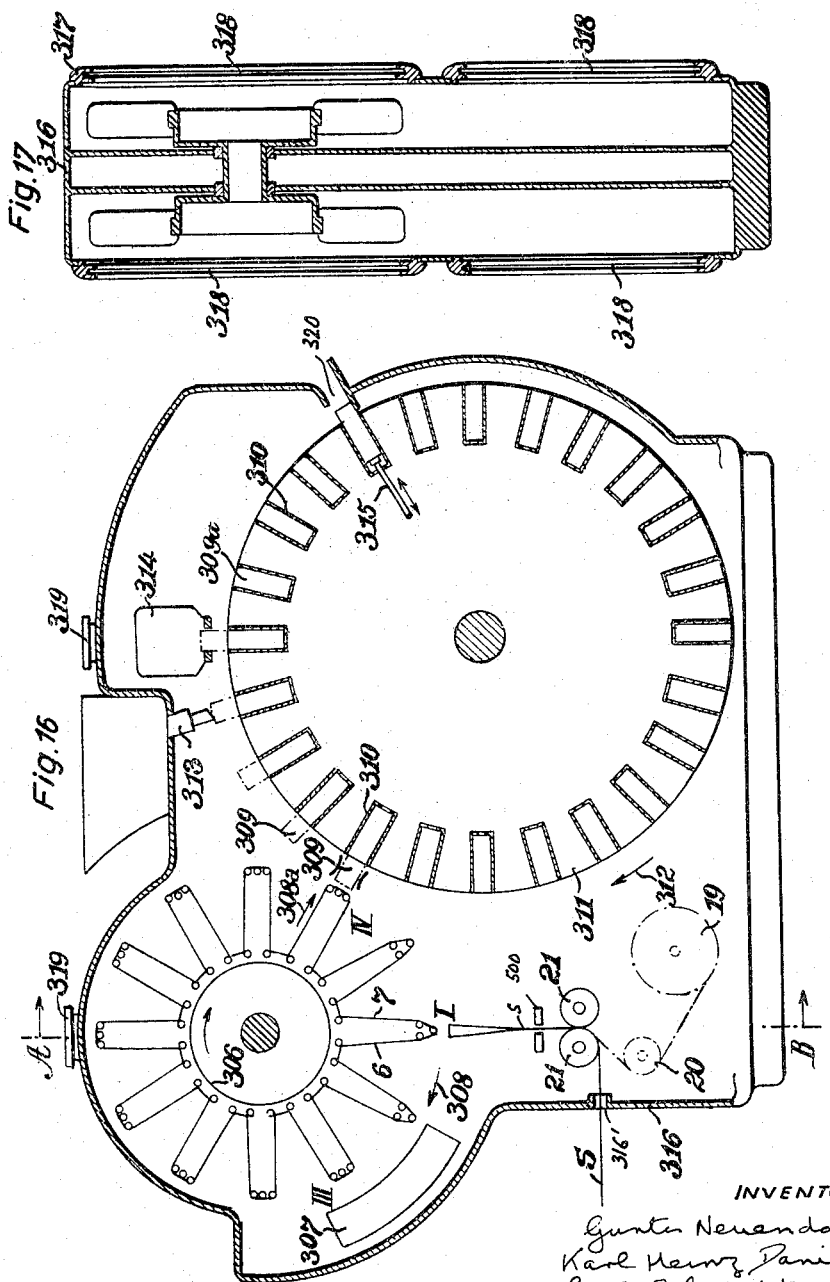

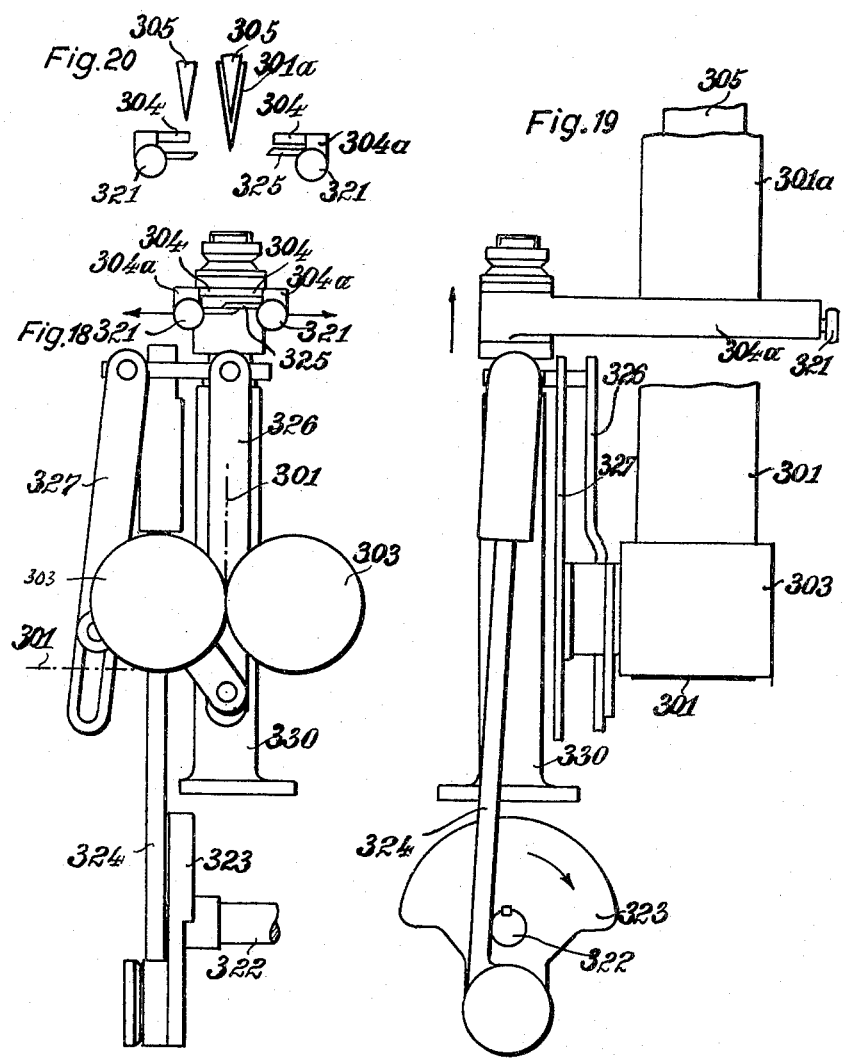

United States Patent Office

2,997,831
Patented Aug. 29, 1961

2,997,831
BAG MAKING APPARATUS
Gunter Neuendorf, Darmstadt-Eberstadt, Karl-Heinz Danielzig, Darmstadt, Paul Schmidt, Dortmund, and Wilhelm Reil, Elmhausen, Germany, assignors to Habra-Werk Wilhelm F. Ott, Darmstadt, Germany
Filed Aug. 17, 1959, Ser. No. 834,356
23 Claims. (Cl. 53—86)

The present invention relates to bag making apparatus, and more particularly to a bag making apparatus for manufacturing bags or containers having a flat bottom in a continuous operation out of a tubular web which is supplied in flat condition in which two layers of the tubular web are superimposed.

Machines of this type are known, and it is the object of the present invention to improve the bag making apparatus according to the prior art, and to provide a bag making apparatus in which the bottom part of the bag or container is formed in a particular simple and advantageous manner.

Another object of the present invention is to provide a movable unit which simultaneously transports the tubular web, and makes bags of the transported tubular web.

Another object of the present invention is to provide means for making a flat transverse bottom in a bag which consists of two superimposed layers sealed to each other along a line.

A further object of the present invention is to provide means for spreading two superimposed layers of a tubular web apart so that the tubular web can be easily slipped onto other spreading means by which a flat transverse bottom is formed.

Another object of the present invention is to provide a completely air-tight housing enveloping a bag making apparatus, and filling and closing means for the bags, and to introduce sterile gas under pressure into the housing means, so that no contaminated air can enter the housing.

Another object of the present invention is to provide transporting means for the web which are actuated by a bag making reciprocating unit.

Other objects of the present invention will become apparent as a description of the present invention proceeds.

With these objects in view, the present invention mainly consists in a bag making apparatus which comprises an operating station which includes supply means for supplying a tubular web consisting of a material which can be sealed; conveyor means movable past the operating station; a plurality of speading means closely spaced along the conveyor means and being supported by the same; a unit including a pair of sealing means, cutting means, and a pair of clamping means; means for reciprocating the unit toward and away from the conveyor means and spreading means; and means operative during movement of the unit to actuate the sealing means and the cutting means to form a cut-off bag and for actuating the clamping means to transport the cut-off free end portion of the tubular web. In this manner, the cut-off bag is placed on a spreading means and transported by the same during movement of the conveyor, while the cut-off free end portion of the supplied tubular web is placed on the next following spreading means.

In accordance with one embodiment of the present invention, the conveyor means is an endless horizontally arranged conveyor band, and in another embodiment of the present invention, the conveyor means is a drum along the periphery of which the spreading means are arranged.

The spreading means of the present invention preferably include a pair of lateral spreading members and a pair of articulated bottom-forming members articulated to each other and to the ends of the lateral spreading members.

When the lateral spreading members are moved apart, the bottom-forming members assume a flat position to form a flat bottom on a bag located on the spreading means.

The flat bottom formed in this manner has two triangular flaps, and in accordance with the present invention means are provided for urging these flap against the bottom of the bag, and for attaching the flaps.

In accordance with the present invention, the flattened tubular web is opened by a wedge which is wedge-shaped in two directions transverse to each other and is particularly advantageous for opening a flattened web having an obliquely cut-off leading end portion.

Preferably, means are provided for first actuating the sealing means and cutting means by which a bag is formed and cut off, and then actuating the clamping means by which the cut-off tubular web is transported towards the next following spreading means.

The arrangement of the present invention permits a continuous operation, even if a new web is started and it is not necessary to adhesively attach the trailing end of a tubular web to the leading end of a new tubular web.

In one embodiment of the present invention, a drum-shaped conveyor has on the periphery thereof spreading means, and is provided with means for pushing the completed bags into receiving means on another transporting drum. By the transporting drum, the bags are moved past a filling station, where they are filled, and then to a closing station where the bags are closed. The filled and closed bags are then ejected.

Preferably, this apparatus is completely closed in an air-tight housing into which sterile gas is introduced under pressure, so that the sterile gas leaves the housing again through the opening for ejecting the closed bags, and through the opening for introducing the web. In this manner, contaminated air is prevented from entering the housing. Preferably, the inlet means for the sterile gas are so constructed that nozzles can be directly attached to the same, so that the apparatus can be flushed while not in use. Preferably, the inlet means of the housing are located in such a manner that the rotating conveyor drum and transporting drum carry the gas, or the cleaning liquid, to all parts of the housing.

According to a modified construction of the present invention, two machines of this type are located in a single housing, and are preferably adjusted to manufacture bags of different volume, which can be obtained by adjusting the bag making unit to cut-off longer bags from the tubular web.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 is a fragmentary schematic side view illustrating a bag making machine according to one embodiment of the present invention;

FIG. 4a is a fragmentary schematic side view of a spreading means according to the present invention;

FIG. 4b is a schematic side view of the spreading means shown in FIG. 4a in another operational position;

FIGS. 5, 6 and 7 are fragmentary side views on an enlarged scale illustrating a bag making device according to the present invention in different operational positions;

FIG. 8 is a plan view of the device shown in FIGS. 5 to 7;

FIG. 9 is a fragmentary view taken in direction of arrow A in FIG. 8;

FIG. 10 is a fragmentary view of the device shown in FIG. 9 taken in direction of the arrow B in FIG. 9;

FIG. 11 is a fragmentary side view of a spreading means for slightly opening a tubular web;

FIG. 12 is a sectional view taken on line 12—12 in FIG. 11;

FIG. 13 is a perspective front view of a wedge means according to the present invention;

FIG. 14 is a side view of the wedge means shown in FIG. 13;

FIG. 15 is a fragmentary perspective view illustrating a device for transporting a web under control of the bag making unit;

FIG. 16 is a fragmentary schematic cross-sectional view of a modified embodiment of the present invention;

FIG. 17 is a sectional view taken on line 17—17 in FIG. 16;

FIG. 18 is a fragmentary schematic side view illustrating a modified apparatus according to the present invention;

FIG. 19 is a front view of the device shown in FIG. 18; and

FIG. 20 is a fragmentary side view illustrating parts of FIG. 18 in a different operational position.

Figure 1:
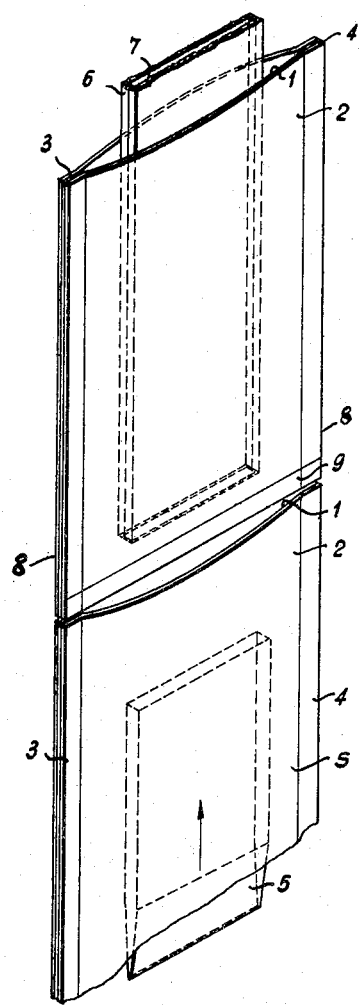
FIG. 1 is a schematic perspective view illustrating a first operational step during a bag making operation.
Figure 2:
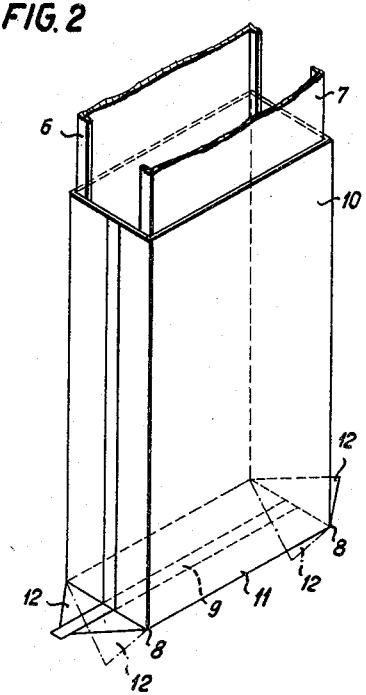
FIG. 2 is a schematic perspective view illustrating a bag during a further operation.
Figure 3:
FIG. 3 is a bottom view of a completed bag on a reduced scale.

Referring to the drawings, and more particularly to FIGS. 1 to 3, a tubular web 2 consists of paper provided with a lining 1, which can be heat-sealed. The tubular web is formed by heat-sealing two longitudinal edges 3, or by folding the paper along one longitudinal edge, and sealing it along the other longitudinal edge. The tubular web is supplied in flattened condition in which its two layers are superimposed. As the web is transported in direction of the arrow in FIG. 1, a wedge 5 enters between the layers and spreads the same apart. The tubular web passes then over spreading means 6, 7 which are shown in collapsed position in FIG. 1. During the first part of the operation, a pair of sealing means forms the sealed seam 9 which extends transversely through the web, and cutting means cut the web adjacent the sealing seam 9 so that a flat bag 8 is formed. During a following operation, the spreading means 6, 7 are moved apart, as shown in FIG. 2, so that the bag assumes a prismatic shape 10 with a flat transverse bottom 11 which terminates in a pair of triangular flaps 12. The rectangular bottom 11 is formed along the lower parallel edges of the spreading members 6 and 7.

In a further operation, the triangular flaps 12 are turned to the position indicated by dash-and-dot lines to extend the side walls of the prismatic bag 10. In a following operation, the flaps 12 are pressed against the bottom 11, and attached to the same, either directly or by a bottom sheet 13 which is attached to the bottom of bag 10 and over the triangular flaps 12, and shown in FIG. 3.

In the arrangement shown in FIG. 4, the flattened web is transported by a pair of transporting rollers 21, which may take the web off a supply reel 19 as shown in FIG. 16. A spreading wedge 5 is arranged above the transporting rollers 21, and opens the tubular web as explained with reference to FIG. 1. The web is further fed over a spreading means 6, 7 while the same is in collapsed position, as shown in FIG. 1. A plurality of spreading means 6, 7 are suspended on endless conveyor bands 14a, 14b which pass over rollers 18. Each spreading means has a lever 16 which, when turned displaces a cam 15 by which the two spreading members 6, 7 are moved apart to the position shown in FIG. 2. A control bar 35 is arranged adjacent the conveyor means to turn levers 16 of a series of spreading means to the spreading position in which the flat bags are spread into prismatic shape. At station I where the web is supplied, a bag making unit is provided which includes heated seal-ing means 24, 25 shown to be controlled by turnable cams 31, 32 to move to and from a sealing position in which the sealed seam 9 is made, as described with reference to FIG. 1. Cutting means 33, 34 are movable to and from a cutting position for cutting off the web adjacent the sealed seam 9. The cutting means 33, 34 are actuated by cam means similar to cams 31, 32, or are directly secured to the cam follower members on which sealing members 24 and 25 are mounted. The flat bags formed in this manner are transported by conveyor means 14a, 14b to station II where the spreading means 6, 7 are actuated by control member 35 so that a flat bottom and triangular flaps 12 are formed on bag 10. First, the triangular flaps 12 project obliquely from the bottom of the bag, but when the guide member 36 passes between the flaps 12, they are straightened to assume a flat condition. The bottom 11 then passes over a plate 41 and a pair of channel-shaped guide means 40 engages flaps 12 and turns the same inwardly over plate 41. At the operating station III, a reciprocating member 45 is provided for attaching the bottom sheets 13 to the bags 10 whereby the triangular flaps 12 are covered and secured to the bottoms 11.

The bottom sheets 13 are cut off from another web 43 which is supplied from a supply reel 42 and transported by a pair of rollers. Member 45 is reciprocated by rotary cam means. When the bags are completed, they pass beyond station III, where the control member 35 ends, permitting the spreading means 6, 7 to collapse. The completed bags are stripped off the spreading means and fall onto a chute 50. A filling station may be provided at this point.

In accordance with the present invention, the spreading means 6, 7 are closely spaced along the conveyor means, so that several bags are located between the stations I and II and between the stations II and III. For example, six spreading means may be provided between the stations. Consequently, the conveyor means can move in very small intermittent motions.

FIGS. 4a and 4b illustrate a preferred embodiment of the spreading means which are advantageously provided in the arrangement of FIG. 4, in which event the plate 41 may be omitted. In addition to the two spreading members 6 and 7, two articulated bottom-forming members 6a and 7a are provided which are articulated to each other and to spreading members 6 and 7. In the collapsed position shown in FIG. 4a, members 6a and 7a form a wedge facilitating the passage of the tubular web onto spreading means. When the lateral spreading members 6 and 7 are spread apart at station II by control bar 35, members 6a and 7a assume the position shown in FIG. 4b in which they are located in a plane transverse to the spreading members. Since members 6, 6a and 7, 7a are rectangular, the entire spreading device assumes a prismatic outline for forming prismatic bags 10 having flat bottoms. When reciprocating member 45 at station III presses the bottom sheet 13 against the bottom of bag 10, members 6a and 7a support the bottom 11 so that the bag cannot be collapsed by the advancing member 45.

As bags are made and cut off by members 24, 25, 33, 34 from the flat tubular web S, and transported by spreading means 6, 7 to station II, the transporting rollers 21 transport the cut-off free end of web S into a position in which the free end passes over the next following spreading means 6, 7 while the same is still in collapsed position.

FIGS. 5 to 10 illustrate a modified construction of the bag making unit in which the sealing means and cutting means are differently operated, and in which a clamping means is provided on the unit for transporting the cut-off free end of the web S. It will be understood that the apparatus shown in FIGS. 5 to 10 is provided in the general arrangement illustrated in FIG. 4 instead of the similar unit illustrated at station I in FIG. 4.

The unit shown in FIGS. 5 to 10 includes a pair of supporting arms 112, 113, best seen in FIG. 8. Arms 112, 113 are turnably mounted on a shaft 114 and are provided with cam follower rollers 115 and 116 which respectively engage a pair of guiding cam means 109 and 110. Guiding means 109 and 110 are respectively turnable about shaft 111 between the position shown in FIG. 5 and the position shown in FIG. 6. Such turning movement is obtained by cams similar to the cams 31 and 32 shown in FIG. 4. The turnable guiding members 109 and 110 are respectively formed with cam grooves 119a and 120a which cooperate another pair of cam follower rollers 115a and 116a. Cam follower rollers 115a and 116a are associated with a pair of clamping members 107 and 108, while a pair of sealing means 24a and 25a, and a pair of cutting means 33a and 34a are associated with cam follower rollers 115 and 116. Shaft 114, on which the supporting arms 112 and 113 are mounted, is slidably guided in a tubular sleeve 117 as shown in FIGS. 9 and 10. Shaft 114, together with arms 112 and 113 and the bag making unit, are reciprocated in the tubular sleeve 117 by hydraulic means. The hydraulic means for raising and lowering shaft 114 include cylinders 117 and 118. Shaft 114 is connected to pistons in the cylinders. When compressed air is introduced into the cylinders underneath the pistons of shaft 114, shaft 114 and the bag making unit are raised. When a pressure medium is introduced above the pistons of shaft 114, the bag making unit is lowered. Air valves, not illustrated, are provided at the lower ends of the cylinders which are opened during the downward movement. By adjusting the length of the stroke of shaft 114, the length of the bag is determined. FIG. 5 shows in solid lines the initial position A of the bag making unit. The unit is in its lowermost position, and the guiding means 109, 110 are spread apart. Cam follower rollers 115a and 116a are located in the cam grooves 119a and 120a. Consequently, the sealing means 24a and 25a, the cutting means 33a and 34a, and the clamping means 107 and 108 are spaced apart, and do not engage the tubular web S which is slightly spread by the wedge 5 and by the springs 106 on wedge 5. Transporting rollers 21 hold the web in a position in which a collapsed spreading means 6, 7 projects with its bottom-forming members 6a and 7a into the free end of the tubular web S. The spreading means shown in FIG. 5 correspond to the construction described with reference to FIGS. 4a and 4b. The spreading means at the center are shown in completely collapsed position, and the other two spreading means 6, 7 are shown in intermediate position corresponding to the position shown in FIG. 4a.

The guiding means 109 and 110 are now moved by cam means, not shown, from the position shown in FIG. 5 to the position B shown in FIG. 6. The sealing means 24a and 25a assume a sealing position compressing the tubular web along a transverse line so that the superimposed layers of the web engage each other. The cutting means 33a and 34a have moved to a cutting position and cut off the flat bag shown in the upper portion of FIG. 6 from the tubular web S. The clamping means 107 and 108 are still spaced from each other since the cam follower rollers 115a and 116a are located in the cam grooves 109a and 110a. Consequently, the spreading wedge 5 opens the cut-off free end of the tubular web which for a moment was compressed by the cutting means 33a and 34a.

The hydraulic means controlling the movement of shaft 114 are actuated and move the entire unit in upward direction as viewed in FIGS. 5, 6 and 7. The upper web portion S' is moved by the feeding means 24a, 25a toward the position shown in FIG. 7. During such movement, the lower end of the web portion S' separates slightly from the free end of web S permitting an opening of the cut-off end by the spreading wedge 5. Thereupon, the cam followers, 115a and 116a move out of the cam grooves 119 and 120, and urge the clamping means 107 and 108 to the clamping position shown in FIG. 7 at C in which the lateral edges of the free end of the tubular web are engaged and clamped, as also shown in FIG. 8. Due to the fact that clamping means 107 and 108 are actuated later than the sealing means 24a, 25a and the cutting means 33a and 34a, the two web portions are slightly separated. In this position, the electric heating means of sealing means 24a and 25a are energized, so that a sealed seam is formed across the upper web portion which is thus transformed into a flat bag 10a. The electric heating means of the sealing means 24e, 25e are flat heating bodies imbedded in the sealing means and provided with the required current by temperature control means. Due to the separation between the two web portions, the heating of the sealing means has no influence on the free end of the supplied tubular web S. During upward movement of the unit, the bag 10a is pushed upon the spreading means 6, 7. Thereupon, the supporting arms 109, 110 move apart to the position shown in FIG. 5 so that the bag making unit assumes the position D in which the bag is released. Since the conveyor moves the spreading means on which the bag 10 is located to the right as viewed in FIG. 5, the completed bag is no longer located opposite the tubular web S, which is now located opposite the next following spreading means 6, 7. The hydraulic means are controlled to lower shaft 114 with arms 112 and 113, so that the unit is moved from the position D to the position A, as shown in FIG. 5. During such downward movement of the unit, the tubular web is advanced a short distance, for example one inch, so that the next following spreading means 6, 7 slightly projects into the cut-off open end of the supplied tubular web as shown in FIG. 5. This is effected by a ratchet means 121 and by ratchet pawl 122 which is pivotally mounted on shaft 114, as best seen in FIG. 10. Ratchet means 121 is shown to be a disc with four pegs connected to transporting roller 21 for rotation, and pawl 122 is shown to be a lever formed with recesses corresponding to the pegs on a ratchet means 121 and spring-loaded to engage such pegs. When shaft 114 moves upwardly, pawl 122 has no effect. When the unit is again moved downwardly from the position D to the position A, pawl means 122 engages one of the pegs on ratchet means 121 and turns ratchet means 121 in clockwise direction as viewed in FIG. 10 so that a transporting roller 123 is turned and transports the tubular web a short distance so that the spreading means project into the open end of the tubular web.

FIGS. 11 to 14 illustrate a particularly advantageous arrangement for slightly opening the collapsed tubular web S after the same has passed through transporting rollers. As best seen in FIGS. 13 and 14, the modified wedge 5' has a front edge 5a, a rear face 5b, a lateral edge 5c, and a lateral face 5d. Consequently, lateral face 5d tapers toward front edge 5a and flares toward rear face 5b. Wedge 5' is utilized for a tubular flattened web S which has an obliquely cut-off leading end 205. As best seen in FIGS. 11 and 12, the web S is guided through a guide channel including a bottom plate 201, lateral channel portions 202, and an upwardly directed end portion 203 located in the bight between transporting rollers 21. The pointed leading free end of web S is gripped first between transporting rollers 21, and opened by the lateral face 5d of wedge 5' so that the collapsed web S is not only spread apart in direction of its movement, but also in transverse direction. When the operator places the pointed free end of web S between the transporting rollers 21, the superimposed layers of the collapsed web are automatically opened by the wedge 5'.

FIG. 15 is a modified embodiment for advancing the web. Guiding means 109, 110 cooperate with rollers 115 and 116 mounted on supporting arms 112, 113. Clamping or holding 404, 405 are directly mounted on sealing means 24a and 25a, and move with the same to clamp the upper portion of the tubular web which is cut off by cutting means 33a, 34a. In this manner, the cut-off portion is more reliably held during the upward movement of the unit with the sealing 24, 25a closed. A pair of connecting rods 402, 403 is articulated to the unit, and move with the same. The lower ends of connecting rods 402, 403 are articulated to a pair of arms 400, 401 which include one-way coupling means connecting the arms 400, 401 to a transporting roller 21a of a pair of transporting rollers 21a, 21b. When the unit moves upward, one of the arms effects transport of the web in upward direction, and when the unit moves downward, the other of the arms effects movement of the web in upward direction.

FIGS. 16 and 17 illustrate a modified embodiment of the present invention in which the conveyor is a drum 306 on which a plurality of spreading means, as shown in FIGS. 4a and 4b, are mounted projecting in radial directions. A tubular collapsed web with two superimposed layers is taken off reel 19 and passes over guide roller 20 to a pair of transporting rollers 21. It is also possible to feed the tubular web S through an opening 316' to the transporting rollers 21. An arrangement for transporting the tubular web, and for cutting and sealing bags from the same, is schematically illustrated at 500 and will be described hereinafter in detail with reference to FIGS. 18 to 20. Such arrangement includes a spreading wedge 5 which opens the collapsed tubular web. The bags made by the bag making unit are placed on the spreading means at station I, and move during turning movement of the conveyor drum 306 to station III where the bottoms of the bags are formed, as described with reference to FIG. 4. Segments corresponding to control member 35a are provided for spreading the spreading means 6, 7. After the triangular flaps have been attached to the bottom of the bag at 307, the finished bags are transported to station IV where a suitable stripper, not shown, pushes the bags in direction of the arrow 308a into the receiving means 310 on a transporting drum 311 which rotates in direction of the arrow 312 in synchronism with the conveyor drum 306. The open bags pass under a filling device 313 where they are filled, and thereupon pass to a closing device 314 by which the bags are closed. The closed and filled bags are ejected by ejector means 315 through outlet means 320 in housing 316. The filling device is of a known construction, and has a reservoir to whose bottom an outlet tube is fixed through which the material is discharged into the bags. A control valve is provided in the outlet tube, and opens whenever the outlet tube of the filling device is over an empty bag.

The closing device 314 mainly consists of spreading fingers which spread the open end of the bag so that its end portion is flattened, whereupon the flattened superimposed portions are sealed by a transverse seam. A pair of clamping means fitted with heating devices are provided for this purpose. When the clamping means are closed, the upper end of the bag is pressed completely flat so that the inner surfaces of the walls of the bag abut each other and can be heat-sealed. The thus closed end of the bag can be flattened, and the thus produced triangular flaps can be attached, as described with reference to the bottom of the bag. The embodiment illustrated in FIGS. 16 and 17 results in very short distances between the bag forming drum 306, the transporting drum 310, and between the filling station 313 and the closing device 314. In this manner, a sterile handling of the bags is obtained and bacteria are prevented from entering the bags, which is of particular importance if the bags are to be filled with milk.

In order to completely exclude any possibility of contamination of the substance filled into the bags, the entire apparatus is completely enveloped by housing 316 which is made air-tight. Windows 317 with transparent panes 318 are provided on housing 316, and permit observation of the operation. Means 319 are provided for attaching exchangeable nozzles. To the normally used nozzle, sterile gas or air is introduced into the housing, and leaves the housing through other openings, for example, the outlet 320 or the inlet 316'. In this manner, entering of contaminated air into the housing 316 is reliably prevented. When cleaning of the machine is desired, another nozzle is attached to inlet means 319, and a cleaning fluid is pumped into the housing so that the entire apparatus is completely cleaned, particularly if the rotary means 306 and 311 are rotated. A drainage valve is provided at the bottom part of the housing for removal of the cleaning liquid. When gas is introduced into the housing, the rotation of means 306 and 311 also improves the circulation of the gas. The temperature of the introduced gas can be controlled, as required by the substance filled into the bags by filling means 313. It is also possible to introduce the sterile gas through opening 316'. The machine is driven by an electro motor, which is preferably arranged outside of housing 316, and which is connected by a Geneva mechanism to the shafts of the rotary means 306 and 311.

As best seen in FIG. 17, not only one but two machines are preferably mounted in housing 316. Preferably, the machines are standardized, so that two machines can be easily connected and coupled to each other.

As explained above, each machine can be adjusted to produce bags of different length, which may be obtained by varying the stroke of the bag making unit. In the embodiment of FIGS. 16 and 17, in which two machines operate simultaneously, bags of different length and consequently of different volume, can be simultaneously manufactured, and moreover different substances can be simultaneously processed by the two machines. One of the machines is preferably provided with spreading means which produce containers having a larger bottom, and the other machine is provided with spreading means producing containers having a smaller bottom. In this manner, by variation of the length of the stroke of one machine, pint and quart containers can be selectively manufactured on one machine by changing the length or height of the containers, while quart and two-quart containers can be manufactured on the other machine in the same housing.

The apparatus illustrated in FIGS. 16 and 17 is provided with the bag making and web transporting apparatus illustrated in FIGS. 18 to 20. A web 301 is transported by transporting roller 303 in upward direction. A bag making unit corresponding to the previously described unit, includes sealing means 304, and cutting means 325 mounted on supporting arm 304a controlled by cam follower rollers 321. A sealing means and cutting means operate as previously described to form a transverse heat-sealed seam in the tubular web, and then to cut off flat bags from the same. The supporting arms 304a of the unit are moved in vertical direction by a crank means 323 on a drive shaft 322 which raises and lowers the supporting arms 304a through connecting rod means 324. The shaft of the supporting arms 304a is guided for vertical movement in a tubular sleeve 330. It will be understood that a corresponding crank device may be provided in the construction shown in FIGS. 5 to 10 for reciprocating shaft 114 of the bag making unit.

In the position shown in FIG. 18, the bag is sealed and clamped by sealing means 304 and cut off by cutting means 325. The electric heating means are energized during upward movement of the cut-off upper portion of the web with the sealing means 304 so that the cut-off web portion is closed and sealed at its lower end, and cut off. The transporting rollers 303 are operated as described with reference to FIG. 15. The pair of connecting rods 326 and 327 are articulated to the reciprocating unit, and act through a pair of arms and through one-way coupling on one of the transporting rollers 303. During upward movement of the unit, transporting roller 303 is turned in counterclockwise direction to transport web 301 through about half the length of a bag, while the cut-off part of the web is placed on the spreading means 305. During the downward movement of the unit, with opened sealing means 304 and cutting means 325, the connecting rod 327 is effective to turn transporting roller 323 in transporting direction, so that web 301 is transported through the second half of the required feeding motion, until the cut-off open end of the supplied web is placed on the next following spreading means 305. The completed bag 301a is transported by the conveyor on the respective spreading means 305.

It will be understood that each of the elements described above, or two or more together, may also find a useful application in other types of bag making apparatus differing from the types described above.

While the invention has been illustrated and described as embodied in an apparatus for making bags or containers having flat bottoms, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Bag making apparatus, comprising in combination, at least one operating station including supply means for supplying a tubular web; conveyor means movable past said station; a plurality of spreading means closely spaced along said conveyor means and being supported by the same for movement past said station; a unit at said station and including a pair of sealing means movable to and from a sealing position for forming a transverse sealed seam in the tubular web, cutting means movable to and from a cutting position for cutting the web along a transverse cutting line so that a sealed bag is formed, and a pair of clamping means movable to and from a clamping position for clamping the cut-off free end of the supplied tubular web; means for reciprocating said unit toward and away from said conveyor means and said spreading means; and means for moving said sealing means to said sealing position, said cutting means to said cutting position, and said clamping means to said clamping position during movement of said unit in a feeding direction toward the one of said spreading means passing said station, whereby the cut-off bag is pushed onto the respective spreading means until the same extends to the sealed seam while the cut-off free end portion of the tubular web is transported by said clamping means of said unit to a position in which the next following spreading means projects into the cut-off end portion while the bag is transported on said first mentioned spreading means during movement of said conveyor means.

2. Bag making apparatus, comprising in combination, at least one operating station including supply means for supplying a tubular web; conveyor means movable past said station; a plurality of spreading means closely spaced along said conveyor means and being supported by the same for movement past said station, each spreading means including a pair of spreading members movable to and from a spaced spreading position; a unit at said station and including a pair of sealing means movable to and from a sealing position for forming a transverse sealed seam in the tubular web, cutting means movable to and from a cutting position for cutting the web along a transverse cutting line so that a sealed bag is formed, and a pair of clamping means movable to and from a clamping position for clamping the cut-off free end of the supplied tubular web; means for reciprocating said unit toward and away from said conveyor means and said spreading means; means for moving said sealing means to said sealing position, said cutting means to said cutting position, and said clamping means to said clamping position during movement of said unit in a feeding direction toward the one of said spreading means passing said station, whereby the cut-off bag is pushed onto the respective spreading means until the same extends to the sealed seam while the cut-off free end portion of the tubular web is transported by said clamping means of said unit to a position in which the next following spreading means projects into the cut-off end portion while the bag is transported on said first mentioned spreading means during movement of said conveyor means; means for actuating each of said spreading means after the same has passed said station so that the respective spreading means moves to said spreading position for spreading the bag thereon, whereby a flat bottom is formed on the bag with two triangular bottom flaps; and means for attaching said bottom flaps to the flat bottom.

3. Bag making apparatus, comprising in combination, at least one operating station including supply means for supplying a tubular web; conveyor means including a horizontal endless conveyor band movable past said station; a plurality of spreading means closely spaced along said conveyor band and being supported by the same for movement past said station; a unit at said station and including a pair of sealing means movable to and from a sealing position for forming a transverse sealed seam in the tubular web, cutting means movable to and from a cutting position for cutting the web along a transverse cutting line so that a sealed bag is formed, and a pair of clamping means movable to and from a clamping position for clamping the cut-off free end of the supplied tubular web; means for reciprocating said unit in vertical direction toward and away from said conveyor means and said spreading means; and means for moving said sealing means to said sealing position, said cutting means to said cutting position, and said clamping means to said clamping position during movement of said unit in a feeding direction toward the one of said spreading means passing said station, whereby the cut-off bag is pushed onto the respective spreading means until the same extends to the sealed seam while the cut-off free end portion of the tubular web is transported by said clamping means of said unit to a position in which the next following spreading means projects into the cut-off end portion while the bag is transported on said first mentioned spreading means during movement of said conveyor means.

4. Bag making apparatus, comprising in combination, a first operating station including supply means for supplying a tubular web; conveyor means movable past said station; a plurality of spreading means closely spaced along said conveyor means and being supported by the same for movement past said station, each spreading means including a pair of lateral spreading members movable to and from a spaced spreading position, and a pair of articulated bottom-forming members articulated to each other and to the ends of said lateral spreading members, said bottom-forming members being normally in a collapsed position and assuming a flat position located in a plane transverse to said lateral spreading members when the same are in said spreading position; a unit at said station and including a pair of sealing means movable to and from a sealing position for forming a transverse sealed seam in the tubular web, cutting means movable to and from a cutting position for cutting the web along a transverse cutting line so that a sealed bag is formed, and a pair of clamping means movable to and from a clamping position for clamping the cut-off free end of the supplied tubular web; means for reciprocating said unit toward and away from said conveyor means and said spreading means; means for moving said sealing means to said sealing position, said cutting means to said cutting position, and said clamping means to said clamping position during movement of said unit in a feeding direction toward the one of said spreading means passing said station, whereby the cut-off bag is pushed onto the respective spreading means until the same extends to the sealed seam while the cut-off free end portion of the tubular web is transported by said clamping means of said unit to a position in which the next following spreading means projects into the cut-off end portion while the bag is transported on said first mentioned spreading means during movement of said conveyor means; a second station including means for actuating each of said spreading means to move to said spreading position after the same has passed said first station, whereby a flat bottom with two flaps is formed in said bag; and means for bending the bottom flaps into a position lying flat on the flat bottom of the bag and abutting against said bottom-forming members in said flat position.

5. In a bag making apparatus, in combination, a spreading means including two lateral spreading members movable between a closely spaced position to a farther spaced spreading position, and a pair of articulated bottom-forming members articulated to each other and to the ends of said lateral spreading members, said bottom-forming members being in a collapsed position extending in direction of said lateral spreading members when the same are in said closely spaced position, and being in a flat position located in a plane transverse to said lateral spreading members when the same are in said spreading position, whereby a flat bottom and two lateral flaps are formed in a bag closed along a transverse line and located on said spreading means.

6. Bag making apparatus, comprising in combination, at least one operating station including supply means for supplying a tubular web, said supply means including a pair of transporting rollers; a spreading wedge located between and above said transporting rollers and adapted to be located in a tubular web transported by said rollers in flattened condition whereby the web is opened; conveyor means movable past said station; a plurality of spreading means closely spaced along said conveyor means and being supported by the same for movement past said station; a unit at said station arranged between said spreading means and said spreading wedge and including a pair of sealing means movable to and from a sealing position for forming a transverse sealed seam in the tubular web, cutting means movable to and from a cutting position for cutting the web along a transverse cutting line so that a sealed bag is formed, and a pair of clamping means movable to and from a clamping position for clamping the cut-off free end of the supplied tubular web; means for reciprocating said unit toward and away from said conveyor means and said spreading means; and means for moving said sealing means to said sealing position, said cutting means to said cutting position, and said clamping means to said clamping position during movement of said unit in a feeding direction toward the one of said spreading means passing said station, whereby the cut-off bag is pushed onto the respective spreading means until the same extends to the sealed seam while the cut-off free end portion of the tubular web is transported by said clamping means of said unit to a position in which the next following spreading means projects into the cut-off end portion while the bag is transported on said first mentioned spreading means during movement of said conveyor means.

7. A spreading arrangement comprising a pair of transporting rollers; guide means for guiding a tubular web having an obliquely cut-off leading end in flattened condition toward said transporting rollers so that the same grip and transport the obliquely cut-off end of the tubular web; and a spreading wedge located on the side of said rollers remote from said guiding means and having a front edge adjacent said rollers and parallel to the axis of the same, and a rear face, said wedge having on one side a lateral edge and on the other side a lateral face tapering toward said front edge and flaring toward the rear face, said lateral face of said wedge being adapted to be aligned with the leading point of the obliquely cut-off tubular web so that the portion of said front edge adjacent said lateral face passes first into the tubular web to spread the same apart.

8. Bag making apparatus, comprising in combination, a first operating station including supply means for supplying a tubular web; conveyor means movable past said station; a plurality of spreading means closely spaced along said conveyor means and being supported by the same for movement past said station, each spreading means including a pair of lateral spreading members movable to and from a spaced spreading position, and a pair of articulated bottom-forming members articulated to each other and to the ends of said lateral spreading members, said bottom-forming members being normally in a collapsed position and assuming a flat position located in a plane transverse to said lateral spreading members when the same are in said spreading position; a unit at said station and including a pair of sealing means movable to and from a sealing position for forming a transverse sealed seam in the tubular web, cutting means movable to and from a cutting position for cutting the web along a transverse cutting line so that a sealed bag is formed, and a pair of clamping means movable to and from a clamping position for clamping the cut-off free end of the supplied tubular web; means for reciprocating said unit toward and away from said conveyor means and said spreading means; means for moving said sealing means to said sealing position, said cutting means to said cutting position, and said clamping means to said clamping position during movement of said unit in a feeding direction toward the one of said spreading means passing said station, whereby the cut-off bag is pushed onto the respective spreading means until the same extends to the sealed seam while the cut-off free end portion of the tubular web is transported by said clamping means of said unit to a position in which the next following spreading means projects into the cut-off end portion while the bag is transported on said first mentioned spreading means during movement of said conveyor means; a second station including means for actuating each of said spreading means to move to said spreading position after the same has passed said first station whereby a flat bottom with two bottom flaps is formed in the bag; a third station including a pair of tapering guide channels adapted to engage the bottom flaps for bending the same into a position lying flat on the flat bottom of the bag and abutting against said bottom-forming members in said first position; and a fourth station including a member movable to and from a position for attaching the bent-over flaps to the flat bottom of the bag while urging the flaps and bottom of the bag against said bottom-forming members.

9. Bag making apparatus, comprising in combination, at least one operating station including supply means for supplying a tubular web; conveyor means movable past said station; a plurality of spreading means closely spaced along said conveyor means and being supported by the same for movement past said station, each spreading means including a pair of spreading members movable to and from a spaced spreading position; a unit at said station and including a pair of sealing means movable to and from a sealing position for forming a transverse sealed seam in the tubular web, cutting means movable to and from a cutting position for cutting the web along a transverse cutting line so that a sealed bag is formed, and a pair of clamping means movable to and from a clamping position for clamping the cut-off free end of the supplied tubular web; means for reciprocating said unit toward and away from said conveyor means and said spreading means; means for moving said sealing means to said sealing position, said cutting means to said cutting position, and said clamping means to said clamping position during movement of said unit in a feeding direction toward the one of said spreading means passing said station, whereby the cut-off bag is pushed onto the respective spreading means until the same extends to the sealed seam while the cut-off free end portion of the tubular web is transported by said clamping means of said unit to a position in which the next following spreading means projects into the cut-off end portion while the bag is transported on said first mentioned spreading means during movement of said conveyor means; means for actuating each of said spreading means after the same has passed said station so that the respective spreading means moves to said spreading position for spreading the bag thereon, whereby a flat bottom is formed on the bag with two triangular bottom flaps; a flat plate located along said conveyor means and adapted to pass between said flaps to engage the flat bottom of the bag; a pair of tapering guide channels opposite said plate and adapted to turn the bottom flaps into a position lying flat against said flat plate; and a member movable to and from a position closely spaced from said flat plate for attaching a bottom sheet to said bottom flaps, said conveyor means moving the bags along said plate, said guide channels and into the region of said movable member.

10. Bag making apparatus, comprising in combination, at least one operating station including supply means for supplying a tubular web; conveyor means movable past said station; a plurality of spreading means closely spaced along said conveyor means and being supported by the same for movement past said station; a unit at said station and including a pair of sealing means movable to and from a sealing position for forming a transverse sealed seam in the tubular web, cutting means movable to and from a cutting position for cutting the web along a transverse cutting line so that a sealed bag is formed, two pairs of holding members located directly adjacent said sealing means and adapted to move to and from a holding position, and a pair of clamping means movable to and from a clamping position for clamping the cut-off free end of the supplied tubular web; means for reciprocating said unit toward and away from said conveyor means and said spreading means; and means for moving said sealing means to said sealing position, said cutting means to said cutting position, said holding means to said holding position holding the cut-off bag, and said clamping means to said clamping position during movement of said unit in a feeding direction toward the one of said spreading means passing said station, whereby the cut-off bag is pushed onto the respective spreading means until the same extends to the sealed seam while the cut-off free end portion of the tubular web is transported by said clamping means of said unit to a position in which the next following spreading means projects into the cut-off end portion while the bag is transported on said first mentioned spreading means during movement of said conveyor means.

11. Bag making apparatus, comprising in combination, a first operating station including supply means for supplying a tubular web; conveyor means movable past said station; a plurality of spreading means closely spaced along said conveyor means and being supported by the same for movement past said station; an operating unit at said first station including a pair of members adapted to be located on opposite sides of the tubular web, said member being movable toward and away from each other, a pair of sealing means respectively supported on said members, a pair of cutting means respectively supported on said members and a pair of clamping means respectively supported on said members so that said sealing means seal the tubular web along a transverse line, and said cutting means cut the tubular web along a transverse line whereby a sealed bag is formed, and so that said clamping means clamp the cut-off free end of the supplied tubular web when said members move toward each other; means for reciprocating said unit toward and away from said conveyor means and said spreading means; and a pair of control members located on opposite sides of said unit and engaging said members of said unit, respectively, said control members being movable to and from a closely spaced position for actuating said sealing means and cutting means, and forming in said closely spaced position a cam means so that during movement of said unit toward said conveyor means said sealing means, cutting means and clamping means are actuated, whereby during movement of said unit the cut-off bag is pushed onto the respective spreading means while the cut-off free end portion of the tubular web is transported by said clamping means of said unit to a position in which the next following spreading means projects into said free end while the bag is transported by said conveyor means.

12. Bag making apparatus, comprising, in combination, a first operating station including supply means for supplying a tubular web; conveyor means movable past said station; a plurality of spreading means closely spaced along said conveyor means and being supported by the same for movement past said station; an operating unit at said first station including a pair of members adapted to be located on opposite sides of the tubular web, said members being movable toward and away from each other, a pair of sealing means respectively supported on said members, a pair of cutting means respectively supported on said members and a pair of clamping means respectively supported on said members so that said sealing means seal the tubular web along a transverse line, and said cutting means cut the tubular web along a transverse line whereby a sealed bag is formed, and so that said clamping means clamp the cut-off free end of the supplied tubular web when said members move toward each other; means for reciprocating said unit toward and away from said conveyor means and said spreading means; and a pair of control members located on opposite sides of said unit and engaging said members of said unit, respectively, said control members being movable to and from a closely spaced position for actuating said sealing means and cutting means, and forming in said closely spaced position a cam means so that during movement of said unit toward said conveyor means said sealing means, cutting means and clamping means are successively actuated, whereby during movement of said unit the cut-off bag is pushed onto the respective spreading means while the cut-off free end portion of the tubular web is transported by said clamping means of said unit to a position in which the next following spreading means projects into said free end while the bag is transported by said conveyor means.

13. Bag making apparatus, comprising in combination, a first operating station including supply means for supplying a tubular web; conveyor means movable past said station; a plurality of spreading means closely spaced along said conveyor means and being supported by the same for movement past said station; an operating unit at said first station including a pair of members adapted to be located on opposite sides of the tubular web, said members being movable toward and away from each other, a pair of sealing means respectively supported on said members, a pair of cutting means respectively supported on said members and a pair of clamping means respectively supported on said members so that said sealing means seal the tubular web along a transverse line, and said cutting means cut the tubular web along a transverse line whereby a sealed bag is formed, and so that said clamping means clamp the cut-off free end of the supplied tubular web when said members move toward each other; means for reciprocating said unit toward and away from said conveyor means and said spreading means; a pair of control members located on opposite sides of said unit and engaging said members of said unit, respectively, said control members being movable to and from a closely spaced position for actuating said sealing means and cutting means, and forming in said closely spaced position a cam means so that during movement of said unit toward said conveyor means said sealing means, cutting means and clamping means are actuated; transporting roller means at said first operating station adapted to engage and transport the tubular web during turning movement thereof and being located between said unit and said supply means; a ratchet means secured to one of said transporting rollers for turning movement therewith; and a ratchet pawl means attached to said unit and engaging said ratchet means to turn the same and said one transporting roller in the direction for transporting the web toward said spreading means when said unit moves away from said spreading means, whereby during movement of said unit the cut-off bag is pushed onto the respective spreading means while the cut-off free end portion of the tubular web is transported by said clamping means of said unit during movement of said unit towards the spreading means and by said transporting rollers during movement of said unit away from said spreading means so that the tubular web assumes a position in which the next following spreading means projects into said free end while the bag is transported by said conveyor means.

14. Bag making apparatus, comprising in combination, at least one operating station including supply means for supplying a tubular web; conveyor means movable past said station; a plurality of spreading means closely spaced along said conveyor means and being supported by the same for movement past said station; a unit at said station and including a pair of sealing means movable to and from a sealing position for forming a transverse sealed seam in the tubular web, cutting means movable to and from a cutting position for cutting the web along a transverse cutting line so that a sealed bag is formed, and a pair of clamping means movable to and from a clamping position for clamping the lateral edges of the cut-off bag; means for reciprocating said unit toward and away from said conveyor means and said spreading means; a pair of transporting rollers arranged between said unit and said supply means at said station; arm means including one-way coupling means for connecting said arm means to one of said transporting rollers; connecting rod means articulated to said arm means and to said unit so that during movement of said unit said one transporting roller is turned for transporting the cut-off free end of the supply tubular web; and means for moving said sealing means to said sealing position, said cutting means to said cutting position, and said clamping means to said clamping position during movement of said unit in a feeding direction toward the one of said spreading means passing said station, whereby the cut-off bag is pushed onto the respective spreading means until the same extends to the sealed seam while the cut-off free end portion of the tubular web is transported by said transporting rollers to a position in which the next following spreading means projects into the cut-off end portion while the bag is transported on said first mentioned spreading means during movement of said conveyor means.

15. An apparatus as set forth in claim 14, wherein said arm means include two arms, each arm including a one-way coupling, said one-way couplings being operative in opposite directions of rotation; and wherein said connecting rod means include two connecting rods respectively connecting said unit with said arms, so that said arms, respectively, turn said one transporting roller in the same direction during reciprocation of said unit in opposite directions.

16. Bag making apparatus, comprising in combination, at least one operating station including supply means for supplying a tubular web; a rotary conveyor drum means turnable about a horizontal axis; a plurality of spreading means closely spaced about the periphery of said conveyor drum means and being supported by the same for movement past said station; a unit at said station and including a pair of sealing means movable to and from a sealing position for forming a transverse sealed seam in the tubular web, cutting means movable to and from a cutting position for cutting the web along a transverse cutting line so that a sealed bag is formed, and a pair of clamping means movable to and from a clamping position for clamping the cut-off free end of the supplied tubular web; means for reciprocating said unit toward and away from said conveyor drum means and said spreading means; and means for moving said sealing means to said sealing position, said cutting means to said cutting position, and said clamping means to said clamping position during movement of said unit in a feeding direction toward the one of said spreading means passing said station, whereby the cut-off bag is pushed onto the respective spreading means until the same extends to the sealed seam while the cut-off free end portion of the tubular web is transported by said clamping means of said unit to a position in which the next following spreading means projects into the cut-off end portion while the bag is transported on said first mentioned spreading means during movement of said conveyor drum means.

17. Bag making apparatus, comprising in combination, at least one operating station including supply means for supplying a tubular web; a rotary conveyor drum means turnable about a horizontal axis; a plurality of spreading means closely spaced about the periphery of said conveyor drum means and being supported by the same for movement past said station, each spreading means including a pair of lateral spreading members movable to and from a spaced spreading position, and a pair of articulated bottom-forming members articulated to each other and to the ends of said lateral spreading members to assume a flat position located in a plane transverse to said lateral spreading members when the same are in said spreading position; a unit at said station and including a pair of sealing means movable to and from a sealing position for forming a transverse sealed seam in the tubular web, cutting means movable to and from a cutting position for cutting the web along a transverse cutting line so that a sealed bag is formed, and a pair of clamping means movable to and from a clamping position for clamping the cut-off free end of the supplied tubular web; means for reciprocating said unit toward and away from said conveyor drum means and said spreading means; and means for moving said sealing means to said sealing position, said cutting means to said cutting position, and said clamping means to said clamping position during movement of said unit in a feeding direction toward the one of said spreading means passing said station, whereby the cut-off bag is pushed onto the respective spreading means until the same extends to the sealed seam while the cut-off free end portion of the tubular web is transported by said clamping means of said unit to a position in which the next following spreading means projects into the cut-off end portion while the bag is transported on said first mentioned spreading means during movement of said conveyor drum means.

18. Bag making apparatus, comprising in combination, at least one operating station including supply means for supplying a tubular web; a rotary conveyor drum means turntable about a horizontal axis; a plurality of spreading means closely spaced about the periphery of said conveyor drum means and being supported by the same for movement past said station; a unit at said station and including a pair of sealing means movable to and from a sealing position for forming a transverse sealed seam in the tubular web, cutting means movable to and from a cutting position for cutting the web along a transverse cutting line so that a sealed bag is formed, and a pair of clamping means movable to and from a clamping position for clamping the cut-off free end of the supplied tubular web; means for reciprocating said unit toward and away from said conveyor drum means and said spreading means; means for moving said sealing means to said sealing position, said cutting means to said cutting position, and said clamping means to said clamping position during movement of said unit in a feeding direction toward the one of said spreading means passing said station, whereby the cut-off bag is pushed onto the respective spreading means until the same extends to the sealed seam while the cut-off free end portion of the tubular web is transported by said clamping means of said unit to a position in which the next following spreading means projects into the cut-off end portion while the bag is transported on said first mentioned spreading means during movement of said conveyor drum means; a transporting drum means turntable about a horizontal axis and having along the periphery thereof a plurality of receiving means, said transporting drum means turning in synchronism with said conveyor drum means; another station including a transferring means for pushing a bag held on a spreading means into a receiving means whereby the bags are successively transferred to, and then transported by said transporting drum means; filling means located opposite the periphery of said transporting drum means for successively filling the bags in said receiving means; a closing device located along the periphery of said transporting drum means for closing filled bags; ejector means for closed bags; and a housing completely enveloping all said means and said unit, and having inlet means for gas under pressure and an outlet means for filled and closed bags opposite said ejector means, said housing means being air-tight and including observation windows so that sterile gas under pressure introduced through said inlet means completely fills said housing means and prevents entering of contaminated air.

19. An apparatus as set forth in claim 18, wherein said inlet means of said housing means are adapted for alternate attachment of supply means for gas and of cleaning-fluid supply means so that upon attachment of cleaning-fluid supply means the parts within the housing means can be cleaned.

20. An apparatus as set forth in claim 18, wherein said inlet means are located in said housing adjacent said conveyor drum means and said transporting drum means so that introduced fluid is partly transported by said conveyor drum means and by said transporting drum means.

21. Bag making apparatus, comprising in combination, at least one operating station including supply means for supplying a tubular web; a rotary conveyor drum means turnable about a horizontal axis; a plurality of spreading means closely spaced about the periphery of said conveyor drum means and being supported by the same for movement past said station; a unit at said station and including a pair of sealing means movable to and from a sealing position for forming a transverse sealed seam in the tubular web, cutting means movable to and from a cutting position for cutting the web along a transverse cutting line so that a sealed bag is formed, and a pair of clamping means movable to and from a clamping position for clamping the cut-off free end of the supplied tubular web; means for reciprocating said unit toward and away from said conveyor drum means and said spreading means; means for moving said sealing means to said sealing position, said cutting means to said cutting position, and said clamping means to said clamping position during movement of said unit in a feeding direction toward the one of said spreading means passing said station, whereby the cut-off bag is pushed onto the respective spreading means until the same extends to the sealed seam while the cut-off free end portion of the tubular web is transported by said clamping means of said unit to a position in which the next following spreading means projects into the cut-off end portion while the bag is transported on said first mentioned spreading means during movement of said conveyor drum means; a transporting drum means turnable about a horizontal axis and having along the periphery thereof a plurality of receiving means, said transporting drum means turning in synchronism with said conveyor drum means; another station including a transferring means for pushing a bag held on a spreading means into a receiving means whereby the bags are successively transferred to, and then transported by said transporting drum means; filling means located opposite the periphery of said transporting drum means for successively filling the bags in said receiving means; a closing device located along the periphery of said transporting drum means for closing filled bags; ejector means for closed bags; another operating station, another conveyor drum means connected to said first mentioned conveyor drum means; another plurality of spreading means on said other conveyor drum means; another unit; another transporting drum means connected to said first mentioned transporting drum means for rotation; another transferring means; another filling means; another closing device; and another ejector means, said other unit being adjusted to produce bags of a length different from the length of the bags of said first mentioned unit; and a housing completely enveloping all said means and said units, and having inlet means for gas under pressure and a pair of outlet means for filled and closed bags opposite said ejector means, said housing means being air-tight and including observation windows so that sterile gas under pressure introduced through said inlet means completely fills said housing means and prevents entering of contaminated air.

22. Bag making apparatus, comprising in combination, at least one operating station including supply means for supplying a tubular web; conveyor means movable past said station; a plurality of spreading means closely spaced along said conveyor means and being supported by the same for movement past said station; a unit at said station and including a pair of sealing means movable to and from a sealing position for forming a transverse sealed seam in the tubular web, cutting means movable to and from a cutting position for cutting the web along a transverse cutting line so that a sealed bag is formed, and a pair of clamping means movable to and from a clamping position for clamping the tubular web; means for reciprocating said unit toward and away from said conveyor means and said spreading means; and means for moving said sealing means to said sealing position, said cutting means to said cutting position, and said clamping means to said clamping position during movement of said unit in a feeding direction toward the one of said spreading means passing said station, whereby the cut-off bag is pushed onto the respective spreading means until the same extends to the sealed seam.

23. Bag making apparatus, comprising in combination, a first operating station including supply means for supplying a tubular web; conveyor means movable past said station; a plurality of spreading means closely spaced along said conveyor means and being supported by the same for movement past said station, each spreading means including a pair of lateral spreading members movable to and from a spaced spreading position, and a pair of articulated bottom-forming members articulated to each other and to the ends of said lateral spreading members, said bottom-forming members being normally in a collapsed position and assuming a flat position located in a plane transverse to said lateral spreading members when the same are in said spreading position; a unit at said station and including a pair of sealing means movable to and from a sealing position for forming a transverse sealed seam in the tubular web, cutting means movable to and from a cutting position for cutting the web along a transverse cutting line so that a sealed bag is formed, and a pair of clamping means movable to and from a clamping position for clamping the tubular web; means for reciprocating said unit toward and away from said conveyor means and said spreading means; and means for moving said sealing means to said sealing position, said cutting means to said cutting position, and said clamping means to said clamping position during movement of said unit in a feeding direction toward the one of said spreading means passing said station, whereby the cut-off bag is pushed onto the respective spreading means until the same extends to the sealed seam.

References Cited in the file of this patent

UNITED STATES PATENTS

| | | |
|---|---|---|
| 1,853,192 | Benke | Apr. 12, 1932 |
| 2,181,816 | Mandell | Nov. 28, 1939 |
| 2,272,251 | Robinson | Feb. 10, 1942 |
| 2,446,798 | Vergobbi | Aug. 10, 1948 |
| 2,565,444 | Waters | Aug. 21, 1951 |
| 2,577,386 | Vergobbi | Dec. 4, 1951 |
| 2,677,319 | Potdwin | May 4, 1954 |
| 2,847,806 | Wang | Aug. 19, 1958 |
| 2,913,966 | Stageberg | Nov. 24, 1959 |

FOREIGN PATENTS

| | | |
|---|---|---|
| 1,167,925 | France | December 1958 |